United States Patent
McCrink et al.

(10) Patent No.: US 7,618,503 B2
(45) Date of Patent: *Nov. 17, 2009

(54) METHOD FOR IMPROVING THE PERFORMANCE OF SEAM-WELDED JOINTS USING POST-WELD HEAT TREATMENT

(76) Inventors: Edward J. McCrink, 124 S. Market Pl., Suite 200, Escondido, CA (US) 92029; Daniel S. Codd, 330 Eldorado Dr., Escondido, CA (US) 92025

( * ) Notice: Subject to any disclaimer, the term of this patent is extended or adjusted under 35 U.S.C. 154(b) by 0 days.

This patent is subject to a terminal disclaimer.

(21) Appl. No.: 12/009,279

(22) Filed: Jan. 17, 2008

(65) Prior Publication Data
US 2008/0115863 A1 May 22, 2008

Related U.S. Application Data

(63) Continuation-in-part of application No. 11/542,970, filed on Oct. 4, 2006, which is a continuation-in-part of application No. 11/519,331, filed on Sep. 11, 2006, now Pat. No. 7,475,478, which is a continuation-in-part of application No. 10/519,910, filed as application No. PCT/US02/20888 on Jul. 1, 2002, now abandoned.

(60) Provisional application No. 60/880,757, filed on Jan. 17, 2007, provisional application No. 60/301,970, filed on Jun. 29, 2001.

(51) Int. Cl.
*C21D 9/50* (2006.01)
*C21D 6/00* (2006.01)

(52) U.S. Cl. .............. 148/663; 148/605; 219/612

(58) Field of Classification Search .............. 148/516, 148/519–521, 526–529, 590, 605, 660–663; 219/607, 610–612, 617; 228/227–231
See application file for complete search history.

(56) References Cited

U.S. PATENT DOCUMENTS 2,262,693 A 11/1941 Mikhalapov .............. 219/10

(Continued)

FOREIGN PATENT DOCUMENTS

EP 1 143 024 10/2001

(Continued)

OTHER PUBLICATIONS

D.S. Codd—Seam welding and cooling-control heat-treatment of martensitic stainless steel, SAE Technical Paper Series: Welding and Joining and Fastening (SP-2196), 2008-01-1132, 11 pages.*

(Continued)

*Primary Examiner*—George Wyszomierski
*Assistant Examiner*—Mark L Shevin
(74) *Attorney, Agent, or Firm*—Russo & Duckworth, LLP

(57) ABSTRACT

The present invention provides a method for heat-treating seam-welded constructions of hardenable steel and ferrous alloys with reduced weld-zone hardness and improved weld-zone ductility and toughness. This method consists of heating the seam weld rapidly with a secondary heat source to a temperature greater than the martensitic start temperature but not greater than the lower critical temperature, followed by immediately allowing the seam weld to air-cool. The rapid tempering of this invention is particularly suited to the production of high strength hardenable alloy seam-welded pipe and tubing and other structures.

11 Claims, 9 Drawing Sheets

U.S. PATENT DOCUMENTS

| | | | | |
|---|---|---|---|---|
| 2,262,705 | A | | 11/1941 | Tuttle .................... 219/10 |
| 2,293,481 | A | | 8/1942 | Wilkie .................... 219/4 |
| 3,046,167 | A | | 7/1962 | Waxweiler et al. ........... 148/135 |
| 3,242,299 | A | | 3/1966 | Laughlin et al. ............ 219/8.5 |
| 3,767,882 | A | * | 10/1973 | Garnier .................... 219/614 |
| 3,807,715 | A | * | 4/1974 | Nelson et al. .............. 266/261 |
| 4,062,705 | A | | 12/1977 | Gondo .................... 148/127 |
| 4,072,035 | A | | 2/1978 | Ziemek et al. .............. 72/209 |
| 4,188,419 | A | | 2/1980 | Detert .................... 427/287 |
| 4,256,486 | A | | 3/1981 | Yoshioka et al. ............ 75/125 |
| 4,413,039 | A | | 11/1983 | Higuchi .................... 428/643 |
| 4,461,679 | A | | 7/1984 | Higuchi .................... 204/27 |
| 4,857,697 | A | * | 8/1989 | Melville .................... 219/121.63 |
| 4,885,215 | A | | 12/1989 | Yoshioka et al. ............ 428/632 |
| 4,966,751 | A | | 10/1990 | Kaede .................... 420/34 |
| 4,975,128 | A | | 12/1990 | Schmitz .................... 148/127 |
| 5,323,265 | A | | 6/1994 | Fujie .................... 359/507 |
| 5,370,751 | A | | 12/1994 | von Hagen .................... 148/330 |
| 5,374,322 | A | * | 12/1994 | Okada et al. ............... 148/663 |
| 5,485,948 | A | | 1/1996 | McCrink .................... 228/126 |
| 5,558,317 | A | | 9/1996 | Nels .................... 267/156 |
| 5,770,832 | A | * | 6/1998 | Carnes et al. ............... 219/109 |
| 5,820,703 | A | * | 10/1998 | Suzuki et al. ............... 148/593 |
| 5,849,116 | A | | 12/1998 | Miyasaka et al. ............ 148/592 |
| 5,871,140 | A | | 2/1999 | McCrink .................... 228/132 |
| 6,149,743 | A | * | 11/2000 | Lund et al. .................... 148/579 |
| 6,235,407 | B1 | | 5/2001 | Ogata .................... 428/626 |
| 6,410,165 | B1 | | 6/2002 | Warren .................... 428/680 |
| 6,639,173 | B1 | * | 10/2003 | Murphy .................... 219/121.14 |
| 6,645,318 | B2 | | 11/2003 | Takahashi .................... 148/325 |
| 6,673,472 | B2 | | 1/2004 | Maki .................... 428/653 |
| 6,676,777 | B2 | | 1/2004 | Kimura et al. ............... 148/529 |
| 6,718,932 | B1 | | 4/2004 | Cecur .................... 123/188.3 |
| 6,730,407 | B2 | | 5/2004 | Mori .................... 428/425.8 |
| 6,786,981 | B2 | | 9/2004 | Yazawa .................... 148/325 |
| 6,814,820 | B2 | | 11/2004 | Ozbaysal .................... 148/671 |
| 6,905,041 | B1 | | 6/2005 | Taketsu .................... 220/562 |
| 6,935,529 | B2 | | 8/2005 | Ishikawa .................... 220/562 |
| 7,157,672 | B2 | | 1/2007 | Gandy .................... 219/612 |
| 2001/0030004 | A1 | | 10/2001 | Kushida .................... 148/325 |
| 2002/0109024 | A1 | | 8/2002 | Molnar .................... 239/585.1 |
| 2003/0025341 | A1 | | 2/2003 | Kollaritsch ................ 293/102 |
| 2003/0138342 | A1 | | 7/2003 | Hirasawa .................... 420/38 |
| 2004/0040944 | A1 | | 3/2004 | Offer .................... 219/128 |
| 2004/0089655 | A1 | | 5/2004 | Matsen et al. ............... 219/602 |
| 2004/0234715 | A1 | | 11/2004 | Gandy .................... 428/36.9 |
| 2004/0262930 | A1 | | 12/2004 | Cumming .................... 293/120 |
| 2005/0028898 | A1 | | 2/2005 | Guelton .................... 148/547 |
| 2005/0257861 | A1 | | 11/2005 | Raos .................... 148/592 |
| 2006/0016519 | A1 | | 1/2006 | Takayama .................... 148/218 |
| 2006/0113011 | A1 | | 6/2006 | Tanida .................... 148/592 |
| 2006/0130940 | A1 | | 6/2006 | Kollaritsch ................ 148/518 |
| 2006/0243353 | A1 | | 11/2006 | Milam .................... 148/524 |
| 2007/0006461 | A1 | | 1/2007 | McCrink .................... 29/894.3 |

FOREIGN PATENT DOCUMENTS

| | | | |
|---|---|---|---|
| GB | 1 343 387 | | 8/1972 |
| JP | 56 47214 | | 4/1981 |
| JP | 62-22704 A | | 10/1987 |
| JP | 04-191319 | | 9/1992 |
| JP | 9 327721 | | 12/1997 |
| JP | 2002137086 | | 5/2002 |
| JP | 2002301577 | | 10/2002 |
| WO | WO 96/27456 | * | 9/1996 |
| WO | WO 99/47287 | | 9/1999 |
| WO | WO 00/37700 | | 6/2000 |

OTHER PUBLICATIONS

KVA Marketing Brochure, 4 pages.*

G.F. Vander Voort et al, Metallography and microstructures of stainless steels and maraging steels, Metallography and Microstructures, vol. 9, ASM Handbook, ASM International, 2004, 20 pages.*

J. Douthett, Heat treating of stainless steels, vol. 4, ASM Handbook, ASM International, 1998, 23 pages.*

Martensitic Stainless Steel, Heat Treater's Guide: Practices and Procedures for Iron and Steel, ASM International, 1995, 1 page.*

T.C. Gouch. Welding metallurgy of stainless steel. pp. 77-78; J. Gordon Parr. An introduction to Stainless Steel. 1965. Allegheny Ludlum Steel Corp. (Stainless Steel Handbook) Claud Bagger, et al. Induction heat treatment of laser welds. vol. 15, No. 4. Nov. 2003. N. Irvine Saz. Hawley's Condensed Chemical Dictionary. 11th Edition. Naoshi Ayukawa, et al. Development of weldable martensitic stainless steel line pipe by HF-ERW process. Stainless Steel World 1999.

* cited by examiner

Four HAZ regions:

1. γ + ferrite ⟶ martensite + ferrite
2. Coarse-grained γ ⟶ martensite
3. Fine-grained γ ⟶ martensite
4. Overtempered base metal

METHOD FOR IMPROVING THE PERFORMANCE OF SEAM-WELDED JOINTS USING POST-WELD HEAT TREATMENT

RELATED APPLICATIONS

This application is a continuation-in-part of U.S. Provisional Application Ser. No. 60/880,757, filed Jan. 17, 2007 and a continuation-in-part application of pending U.S. application Ser. No. 11/542,970, filed Oct. 4, 2006, which is in turn a continuation-in-part application of U.S. application Ser. No. 11/519,331, filed Sep. 11, 2006, now U.S. Pat. No. 7,475,478, which is in turn a continuation-in-part application of U.S. application Ser. No. 10/519,910, filed Dec. 30, 2004, now abandoned, which is in turn, a National Phase application of International Application Serial No. PCT/US02/20888 filed Jul. 1, 2002, which in turn, claims priority to U.S. Provisional Application Ser. No. 60/301,970, filed Jun. 29, 2001. Each of these applications is incorporated in their entirety by reference.

BACKGROUND OF THE INVENTION

This invention relates to post-weld thermal treatments and methods. More particularly, this invention is directed to methods for improving the mechanical properties of seam welds with reduced weld-zone hardness and improved weld-zone ductility and toughness on hardenable ferrous alloys.

Ubiquitously used throughout all modern industries, welded ferrous alloys have become the de facto standard in structural component design. Current trends in many fields have focused interest away from low-strength common mild steels towards high and ultra high strength steels. These alloys are formulated to have greater tensile strengths than low-carbon steels, due to the specific microstructures that are produced during thermomechanical processing. Some examples of high strength steels currently in use in the automotive industry include dual-phase, martensitic, boron-treated, and transformation-induced plasticity steels. Other high-strength alloys include air, oil and water hardenable carbon steels and martensitic stainless steels. All of these are designed so that some volume percentage of martensite forms in the material's microstructure. The resulting distorted body-centered cubic (BCC) or body-centered tetragonal (BCT) martensitic crystal structure formed in the hardened condition imparts high strength to the metal. These materials are ideally suited for structural components and assemblies, satisfying the requirements of high strength and toughness.

Unfortunately, the tendency to form martensite, and relative high hardenablity, of these and other ultra high-strength alloys poses difficulties in welding. The thermal cycle of heating and rapid cooling, which occurs within the confined heat-affected-zone (HAZ) during welding, is equivalent to a rapid quenching cycle. The chemistry of high strength steel grades results in a complete transformation from ferrite to austenite ($\gamma$) at high temperature, followed by a subsequent change to the hard martensite phase upon rapid cooling. In seam welding applications, the natural weld cooling rate can be as high as 1000° C./s, sufficiently fast enough to produce a martensitic structure in most high strength, high-carbon alloys. (See FIGS. 1 and 2). The resulting martensitic structure produced is extremely brittle in the untempered condition. Cracking of the weld zone can occur for several reasons, including:

Hydrogen induced cold-cracking, due to trapped hydrogen in the distorted BCC martensite crystal structure. Tensile stress applied to the weld increases the risk of cracking.

Thermal induced stresses, due to the heat input during welding, degree of joint restraint, and the volume change upon martensite transformation.

Most forms of cracking result from shrinkage strains that occur as the weld metal cools to ambient temperature. If the contraction is restricted, the strains will induce residual tensile stresses that cause cracking. There are two opposing forces: the stresses induced by the shrinkage of the metal, and the surrounding rigidity of the base material. Large weld sizes, high heat input and deep penetrating welding procedures increase the shrinkage strains. The stresses induced by these strains will increase when higher strength filler metals and base materials are involved. With higher yield strengths, higher residual stresses will be present.

These problems occur when welding certain steels regardless of their prior condition, whether annealed, hardened, or hardened-and-tempered. They can occur with all types of welding, including GTAW, GMAW, SAW, PAW, laser-beam, friction, resistance and electron-beam. In all cases, the fusion zone and high-temperature HAZ will be in the "as-quenched" condition after welding. Any mechanical straining after welding, either in secondary fabrication processes or in service, may cause the martensitic HAZ to crack.

Additionally, many assemblies, once welded and fabricated from these alloys, cannot be subjected to a final homogenizing solution heat treatment cycle. Examples include assemblies fabricated from pre-hardened or special thermo-mechanically processed base metals, such as dual phase steels, whereby the heat cycle would destroy the unique microstructure of the alloy. Also, placing the entire welded assembly into a furnace to be post-weld stress relieved may not be physically feasible, as the case of automotive structural beams welded to the massive vehicle body structure. Some assemblies would not tolerate an entire-structure post-weld thermal treatment, as is the case for welded automotive fuel tank assemblies with thermoplastic interior components. In any case, great benefits could be realized if the as-welded brittleness could be reduced. Ductility and toughness of the finished weld would be greatly improved in the case of welded structures put into service without any further thermal treatment.

Typical methods of controlling weld and HAZ hardness include off-line secondary post-weld heat treatments (PWHT) such as process annealing and tempering of the weld by heating the entire part. Pre-heating methods can be used to slow the rate of cooling, thereby reducing the percentage of the martensitic phase present. The latent heat in the workpiece reduces the cooling rate of the welded seam, and cracking is thus inhibited. In the past, pre- and post-weld heat treatments have been performed in large batch heat treatment furnaces to ramp and hold a group of components at a suitable heat treatment temperature. Drawbacks to the use of batch heat treatment processes include long heat treatment times, due in part to the mass of the large batch furnace and the mass of the components being heat treated. Additionally, long queuing times occur while batches are assembled as individual components are welded. Standard post-weld thermal treatments, such as stress relieving or tempering, involve relatively long hold times at prescribed temperatures, on the order of several hours, along with slow furnace cooling. To compound matters more, a global pre-or-post-weld heat treatment can destroy the desired microstructure of the base metal. Parts made from dual phase or martensitic steels, for example, may suffer an overall loss in mechanical properties if the entire part is subjected to a thermal treatment with other-than optimal heating times and quench rates.

It is well known in fabrication shops to re-heat welds to re-austenitize the seam weld with an oxyacetylene torch and allow the joint to cool slowly in still air when working with hardenable steels, such as chromoly alloys. The heat retained by the weld joint and surrounding metal effectively slows the cooling rate of the weld after re-heating, reducing the brittleness, leaving the joint in a softer, normalized condition. However the process is variable, slow, piece-wise and the results are highly dependent on the fabricator's skill level. Alternative methods, such as those described by U.S. Pat. No. 3,046, 167, entitled Heat-Treating Method and Product, provide for the re-austenitization of the weld seam with torches followed by slow cooling. Similar methods are described in U.S. Pat. No. 6,676,777, entitled Postweld Heat Treatment Process of Carbon Steel and Low Alloy Steel, which prescribes reheating the weld to the austenite region and holding for some time, followed by "slower than air" cooling. All of these methods rely on reheating the weld seam above the upper-critical temperature and slow cooling to produce the desired microstructure.

Conventional controlled "localized" post-weld stress relieving is often applied to severe service industrial and oilfield piping welded joints. Heat is applied through heating "blankets" which consist of inductive or resistance heating coils wrapped around the joint's circumference. The heat is applied very slowly, allowed to dwell at a peak temperature for several minutes to several hours, and then allowed to cool very slowly in the insulative heating blanket.

In seam-welded tube production, the traditional approach to solve welding difficulties inherent of high-strength alloys is to modify the material's chemical composition. Typically, low-carbon versions of air-hardenable alloys are developed so that the seam-weld does not become fully martensitic and will not crack during tube production. An example of this is U.S. Pat. No. 7,157,672 entitled Method of Manufacturing Stainless Steel Pipe For Use In Piping Systems, which details the use of low-carbon dual-phase 0.08% C max stainless material in conventional tube manufacturing processes. Similarly, a modified composition is used to produce pipe in the following article: *Development of weldable martensitic stainless steel line pipe by HF-ERW process*, N. Ayukawa, et al., Stainless Steel World 1999 Conference Proceedings, 1999. In modifying the chemical composition, there is a tradeoff of between the ease of welding and the material's hardenability and maximum mechanical properties.

Another method to reduce weld hardness is to add filler material, whereby the final metallurgy is modified in such a way that the percentage of hard and brittle components such as martensite is reduced. However, some seam welding processes (such as laser or resistance) are difficult to use with filler metals. Additionally, costly filler metals are selected so as to not harden upon cooling, and thereby provide lower strength weldments. This necessitates an even larger weld to be used to meet the required joint strength.

Other methods to improve seam weld properties include mechanically straining and working the weld to induce residual compressive stresses and thereby reduce the tendency of weld seam cracking. This method is not effective, or even possible, for all but the simplest seam weld geometries. U.S. Pat. No. 4,072,035 entitled Strengthening of a Welding Seam, details this method.

It is well known in seam-welded tubing production to use "seam annealers" to improve the mechanical properties of the seam weld. These devices, designed to operate on non-hardenable alloys such as low-carbon steels and austenitic stainless steels, apply a secondary heat source on the seam weld downstream of the weld source after it cools fully to ambient temperature. Two main distinctions apply: firstly, "seam annealers" reheat the weld to above the $A_{C_3}$ temperature, re-austenitizing the material and hold for some time then allowing to slow cool, equivalent to a "normalizing" heat treatment cycle; secondly, "seam annealers" are employed on non-hardenable alloys. Examples of the "seam-annealing" processes are described in U.S. Pat. No. 3,242,299 entitled Inductor for Induction Heating Apparatus, and U.S. Pat. No. 4,975,128, entitled Method For Heat-Treating Straight Bead Welding Pipes For Use in Piping Systems.

U.S. Pat. No. 2,293,481 entitled Welding Apparatus and U.S. Pat. No. 2,262,705 entitled Electric Welding describe methods to produce welds with reduced brittleness. Both methods utilize a relatively short tempering cycle on hardenable alloys, reheating the weld to improve mechanical properties. However, these methods employed on band-saw blades and spot welds differ from the present invention. These processes are performed in-situ using the same equipment as used to produce the weld. Indeed, the spot welding equipment must stay in place for proper quenching for the method of U.S. Pat. No. 2,262,705, then followed immediately by reheating to temper the weld. Most significant is that these processes are employed on discrete weld joints: i.e., spot, flash, or projection type welds.

Conventional processes such as batch pre-heating and PWHT do not lend themselves to cost-efficient, high-quality, high volume production. Unfortunately, these methods are not cost, time, nor energy efficient for high production levels associated with modern manufacturing methods. The ideal solution would allow for either autogenous welds (i.e. no filler metal used) or the use of matching strength filler metals, of similar chemical compositions to the base metals being welded that are capable of hardening to a high strength joint, combined with rapid heating and inexpensive air-cooling cycles.

The present inventors describe various methods for increasing weld and HAZ ductility within U.S. Pat. No. 7,232,053 issued Jun. 19, 2007; U.S. Provisional Application Ser. No. 60/879,861, filed Jan. 10, 2007; U.S. application Ser. No. 11/542,970, filed Oct. 4, 2006; U.S. application Ser. No. 11/526,258 filed Sep. 22, 2006; U.S. application Ser. No. 11/519,331, filed Sep. 11, 2006;U.S. application Ser. No. 10/519,910, filed Dec. 30, 2004; International Application Ser. No. PCT/US02/20888 filed Jul. 1, 2002; U.S. Provisional Application Ser. No. 60/301,970, filed Jun. 29, 2001. Each of these references are incorporated by reference in their entirety herein. Unfortunately, even these methods have disadvantages.

Thus, it would be desirable from a production point of view to provide a heat treatment during production would be preferred in order to improve the mechanical properties of seam welded joints. Preferably, a simple PWHT method could be used to appreciably increase weld and HAZ ductility.

SUMMARY OF THE INVENTION

Briefly, in accordance with the invention, we provide improved methods of forming steel structures including but not limited to welded tube structures. In the broadest of terms, the present invention is directed to an improved post-weld heat treatment (PWHT) for hardenable ferrous alloys.

The method of forming a steel structure of the present invention includes treating a traditional weld formed when two surfaces of hardenable ferrous alloys are welded together. The initial weld is formed by applying a heat source, preferably in the form of a traditional welding apparatus, so as to bring adjoining surfaces to sufficiently high temperatures so as to melt the ferrous alloys and form a weld. The weld is then allowed to cool to below the martensitic start ($M_S$) temperature for the hardenable ferrous alloys. The weld may be cooled to ambient temperature. Alternatively, the weld may be cooled to an intermediate temperature between the ferrous alloys' martensitic start ($M_S$) temperature and ambient temperature.

Subsequent to the seam-weld cooling below the martensitic start ($M_S$) temperature, the seam-weld is tempered in a post-weld heat treating process. The seam-weld is rapidly heated at a rate of 10° C. per second or greater to above the martensitic start ($M_S$) temperature of the hardenable ferrous alloys of the weld. However, the weld is not heated above the lower critical temperature ($A_{C1}$) of the weld's hardenable ferrous alloys. Of importance, the weld is heated rapidly, at a rate of at least 10° C. per second and a rate of 200° C. per second is preferred. Heat to the weld seam may be applied using a variety of heat sources though a localized heat source is preferred. The localized heat sources include, but are not limited to, propane or oxyacetylene torches, resistance, electric arc, lasers, conductive, radiation, convection or high-frequency induction methods. The localized heat sources described herein provide heat to the weld and adjoining areas, but do not heat the entire component.

Once a seam weld has been tempered by heating the seam weld to above the martensitic start ($M_S$) temperature but not to above the lower critical temperature ($A_{C1}$) for the hardenable ferrous alloys, the seam weld is immediately air cooled without a soak time at a holding temperature. Air quenching is conducted at greater than 15° C. per minute though preferably not above 200° C. per second as may be provided by water cooling.

A wide variety of "hardenable ferrous alloys" may be employed in the practice of the present invention including those steels and alloys that are considered air hardenable. The method of forming a steel structure and methods for post-weld heat treatment of the present invention are believed to have particular application to hardenable martensitic stainless steels, particularly those of type 410, 420 and 440. Because different alloys will possess different lower critical temperatures, martensitic start ($M_S$) temperatures, and martensitic finish ($M_F$) temperatures, and because weld characteristics will vary depending on the weld design, the tempering rate, tempering final temperature and cooling rates will vary.

The method of forming steel structures of the present invention is also believed to have particular application for forming seam welded pipe and tubing structures, as well as for creating circumferential welds such as on gas or liquid tanks.

Accordingly, it is an object of the present invention to provide an improved method for forming welded steel structures of hardenable ferrous alloys.

It is an additional object of the invention to provide an improved method for forming steel structures wherein heat treatment can be conducted during initial production in order to improve the mechanical properties of seam welded joints.

It is still an additional object of the present invention to provide a post-weld heat treatment system which will increase weld and HAZ ductility without increasing processing time.

It is still another object of the present invention to provide a method for forming steel structures which is inexpensive and relatively simple to implement.

These and other further objects and advantages of the invention will be apparent to those skilled in the art from the following detailed description taken in conjunction with the drawings.

DETAILED DESCRIPTION OF THE INVENTION

Figure 1:
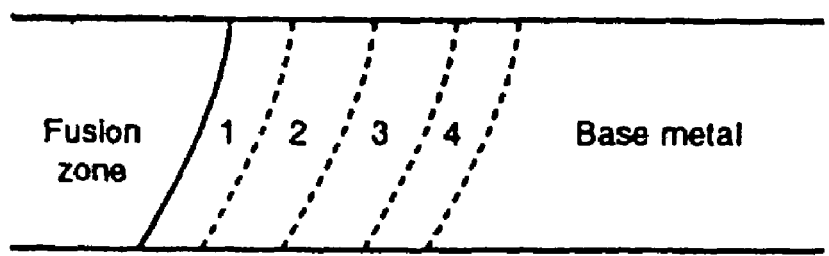
FIG. 1 is a chart illustrating the four distinct microstructure regions observed in the heat-affected zone (HAZ) of air-hardenable steels after welding.
Figure 2:
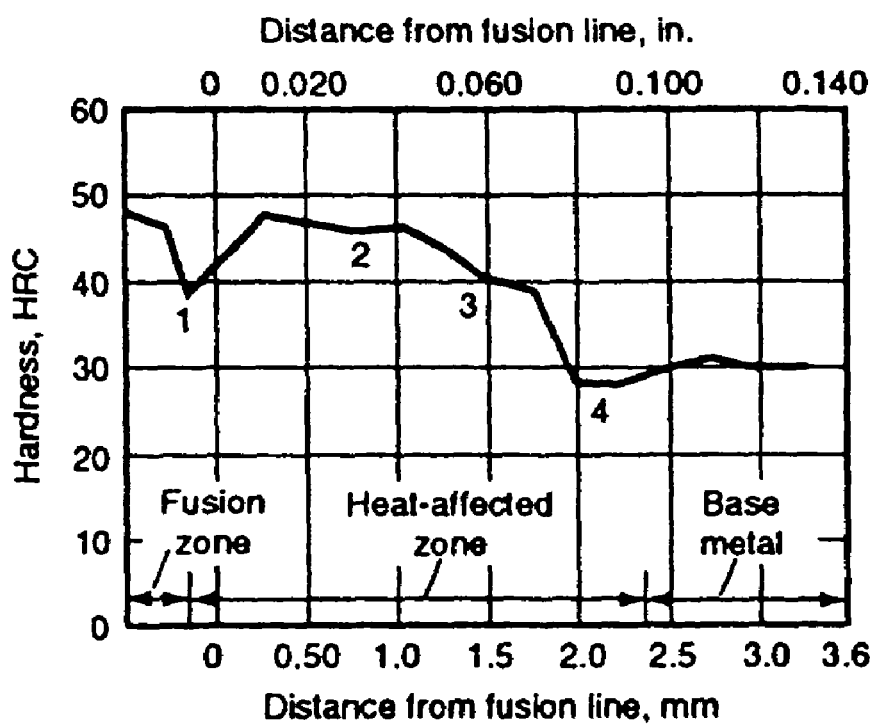
FIG. 2 is a graph of microhardness across a typical weld in an air-hardenable martensitic stainless steel with no pre- or post-heat treatment.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

The present invention includes methods of processing seam welds and seam welded structures fabricated from high strength steels and other hardenable alloys. The present invention is believed to have particular application to alloys, which upon seam welding, transform into martensitic weld and HAZ microstructures, and accordingly the following description has particular application to such steels. The process of the present invention allows for improved ductility and toughness of the weld zone and reduced brittleness and susceptibility to hydrogen-induced cold cracking of the weld. The invention allows for improved mechanical straining and deformation of the weld-zone, both the fusion zone and HAZ, eliminating the need for additional post-weld solution heat treatment of the entire structure, such as a process annealing, subcritical annealing or stress relieving. The invention's localized heat treatment eliminates the risk of altering the base metal's material properties and microstructure, making the invention suitable for pre-weld thermomechanically processed alloys as well as those that cannot physically undergo an entire-part heat treatment.

As outlined in the SAEJ412 specification, GENERAL CHARACTERISTICS AND HEAT TREATMENTS OF STEELS, "The HARDENABLITY or response to heat treatment is probably the most important single criterion for the selection of steel. Hardenability is that property of steels which determines the depth and distribution of hardness induced by quenching from above the transformation range.... The term hardening implies that the hardness of the material is increased by suitable treatment, usually involving heating to a suitable austenitizing temperature followed by cooling at a certain minimum rate which depends upon the alloy content. If quenching is complete, the resulting structure is martensite . . . its hardness depends upon carbon content of the steel."

As defined herein, the term "hardenable alloys" refers to directly hardenable grades of steels and ferrous alloys that are responsive to a heat treatment. Additionally, "hardenable alloys" possess sufficient carbon content, in conjunction with other alloying elements, to form a martensitic microstructure in the fusion and HAZ after conventional seam welding. "Hardenable alloys" as defined herein posses well defined transition temperatures, dependent on the particular chemical composition of the alloy, including: $A_{C3}$—upper critical temperature, $A_{C1}$—lower critical temperature, $M_S$—martensitic start temperature, and $M_F$—martensitic finish temperature. "Hardenable alloys" includes those steels and alloys that are considered air-hardenable, as the natural quench cooling rate associated with seam welding is greater than air quenching. As defined herein, the term "hardenable alloys" does not include those steels and ferrous alloys who are considered "low carbon carburizing grades," which respond to heat treatment only through infusing elements into the material's surface via case hardening processes.

Representative hardenable alloys for which the present invention is applicable include, but are not limited to:

SAE 1030, 1034, 1035, 1037, 1038, 1039, 1040, 1042, 1043, 1044, 1045, 1046, 1049, 1050, 1053, 1536(1036), 1541 (1041), 1547(1047), 1547(1047), 1548(1048), 1551(1051), 1552(1052)

SAE 1055, 1059, 1060, 1064, 1065, 1069, 1070, 1074, 1075, 1078, 1080, 1084, 1085, 1086, 1090, 1095, 1561(1061) 1566(1066), 1572(1072)

SAE 1330, 1335, 1340

SAE 4037, 4047, 4130, 4135, 4137, 4140, 4142, 4145, 4150, 4161, 4340

SAE 5046, 50B40, 50B44, 50B46, 50B50, 5060, 50B60,

SAE 5130, 5132, 5135, 5140, 5145, 5147, 5150, 5155, 51B60

SAE 6150

SAE 8630, 8637, 8640, 8642, 8645, 8650, 8655, 8660, 8740

SAE 81B45, 86B45, 94B30

SAE 9254, 9255, 9260

SAE 50100, 51100, 52100

SAE 51410, 51414, 51420, 51431, 51440A, 51440B, 51440C, 51501

22MnB5

30MnB5

DP600

DP800

DP1000

Figure 3:
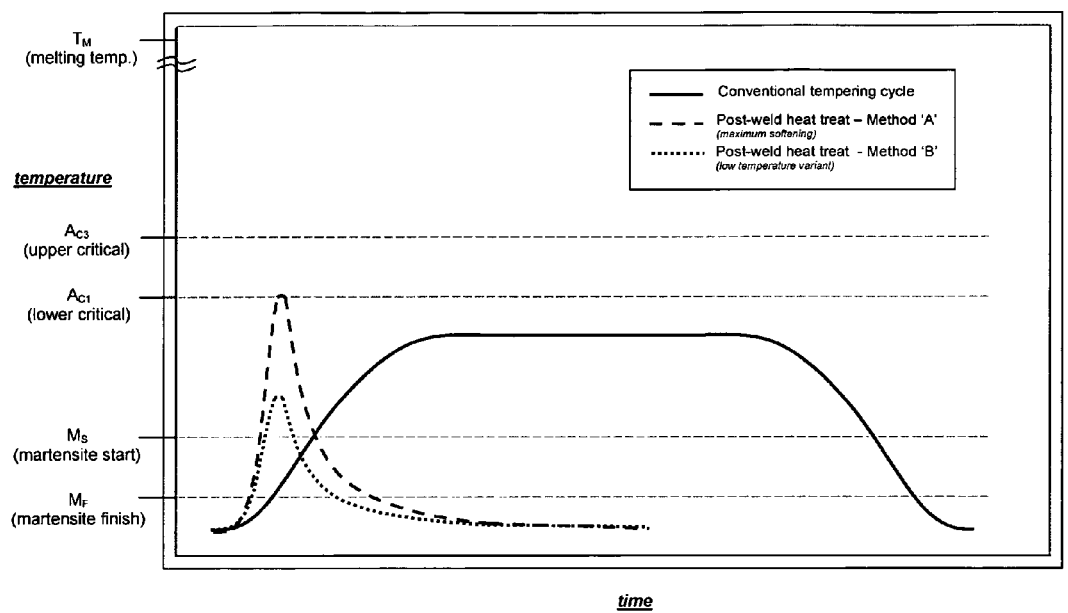
FIG. 3 is graph of post-weld heat treatment temperature profiles for conventional tempering compared with the temperature profiles of the present invention.
Figure 4:
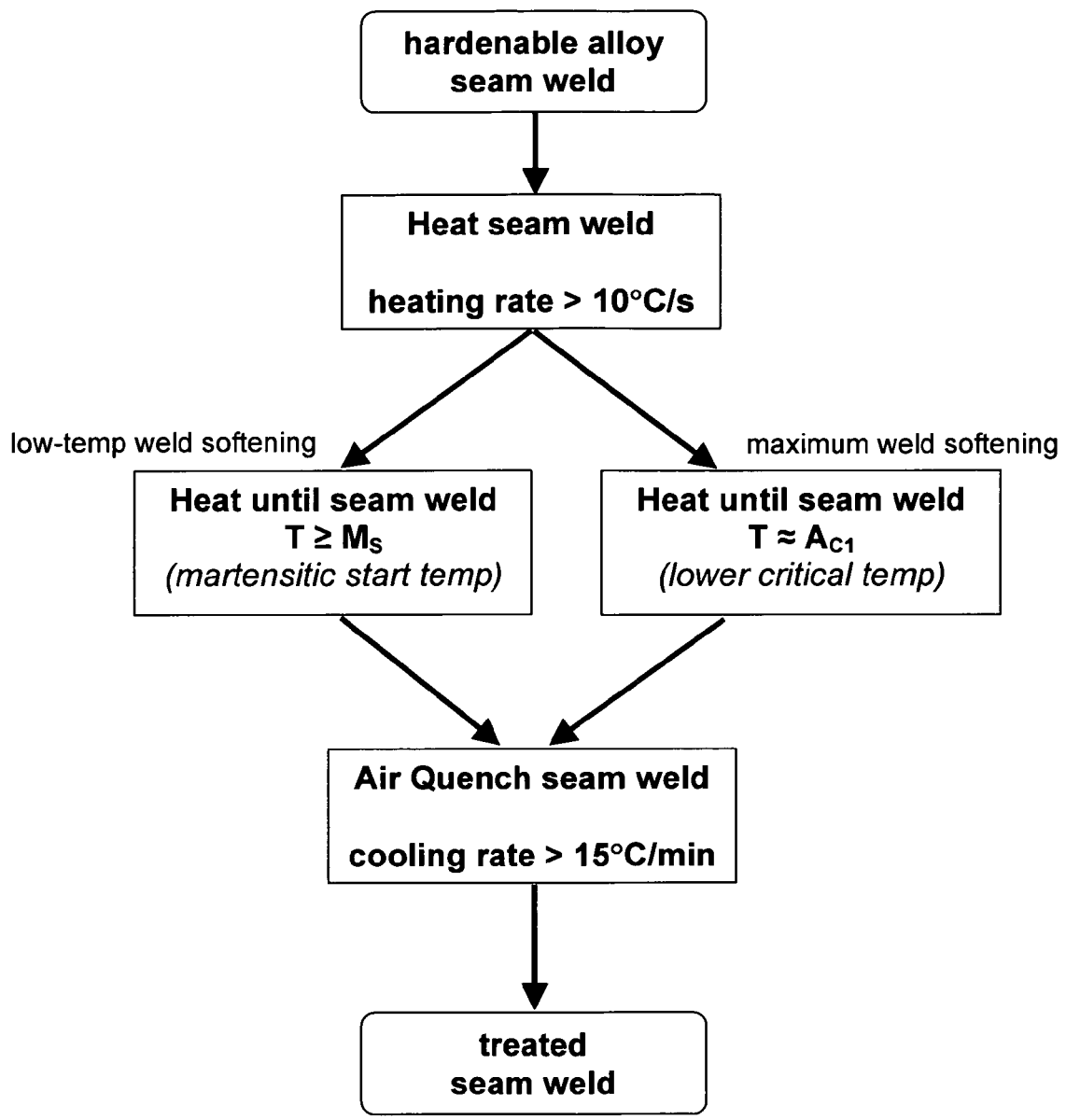
FIG. 4 is a flow chart depicting the post-weld heat treatment process of the present invention.

The preferred method of the present invention includes forming a seam weld to join two surfaces of hardenable martensitic steel. The seam weld is allowed to cool to below the martensitic start temperature—Ms of the weld. The temperature of the weld may, or may not, be cooled below the martensitic finish temperature or even to ambient temperature. As illustrated in FIG. 3 and FIG. 4, thereafter the completed seam weld is rapidly heated, either to the $A_{C1}$—lower critical temperature (eutectoid temperature) of the weld metal, or to a lower intermediate temperature greater than the martensitic start ($M_S$) temperature, and allowing the weld to air-cool. In a first embodiment identified as Method "A" in FIG. 3 and as depicted by the dashed line on the temperature vs. time chart, the seam weld is heated to the $A_{C1}$ temperature but not beyond the $A_{C1}$—lower critical temperature. This embodiment will allow for maximum softening of the weld seam, as all of the martensite would undergo maximum high-temperature tempering. In a second embodiment illustrated as Method "B" in FIG. 3 and as illustrated by the dotted line on the temperature vs. time chart, heating to an intermediate temperature, will serve to improve the weld seam's toughness by reducing embrittlement without overly softening, and without overly reducing the tensile strength of the weld.

The rapid heating of the seam weld is conducted at a rate greater than 10° C./s. Preferably, rapid heating of the seam weld is conducted even more rapidly at approximately 200° C./s. The rapid heating is followed immediately (no soak times at a holding temperature) by air quenching. The "immediate" transition of rapid heating to air cooling is meant to be construed relatively broadly to include transition periods of a few seconds or even a few minutes as may be incidental to the manufacturing process. However, the "immediate" transition period of rapid heating to air cooling is not meant to include isothermal soak times where significant changes to the ferrous alloy's crystal microstructure are allowed to occur, such as coarsening of carbide precipitates and recrystallization. Preferred quench rates, consistent with air cooling, are greater than 15° C./min but less than 200° C./s.

Figure 5:
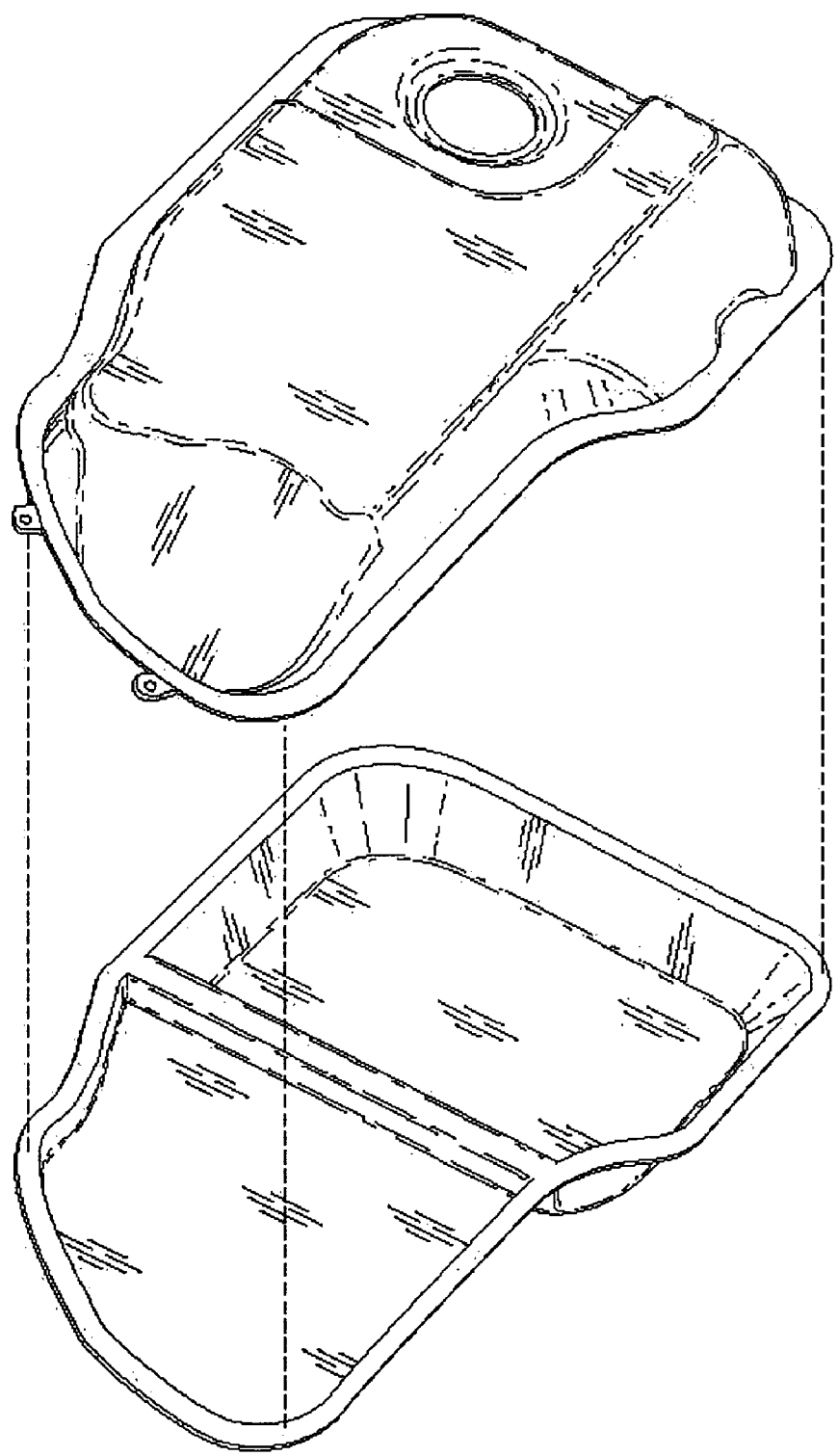
FIG. 5 is a perspective exploded view of a typical clamshell tank assembly constructed from pre-hardened shells prior to flange seam welding.
Figure 6:
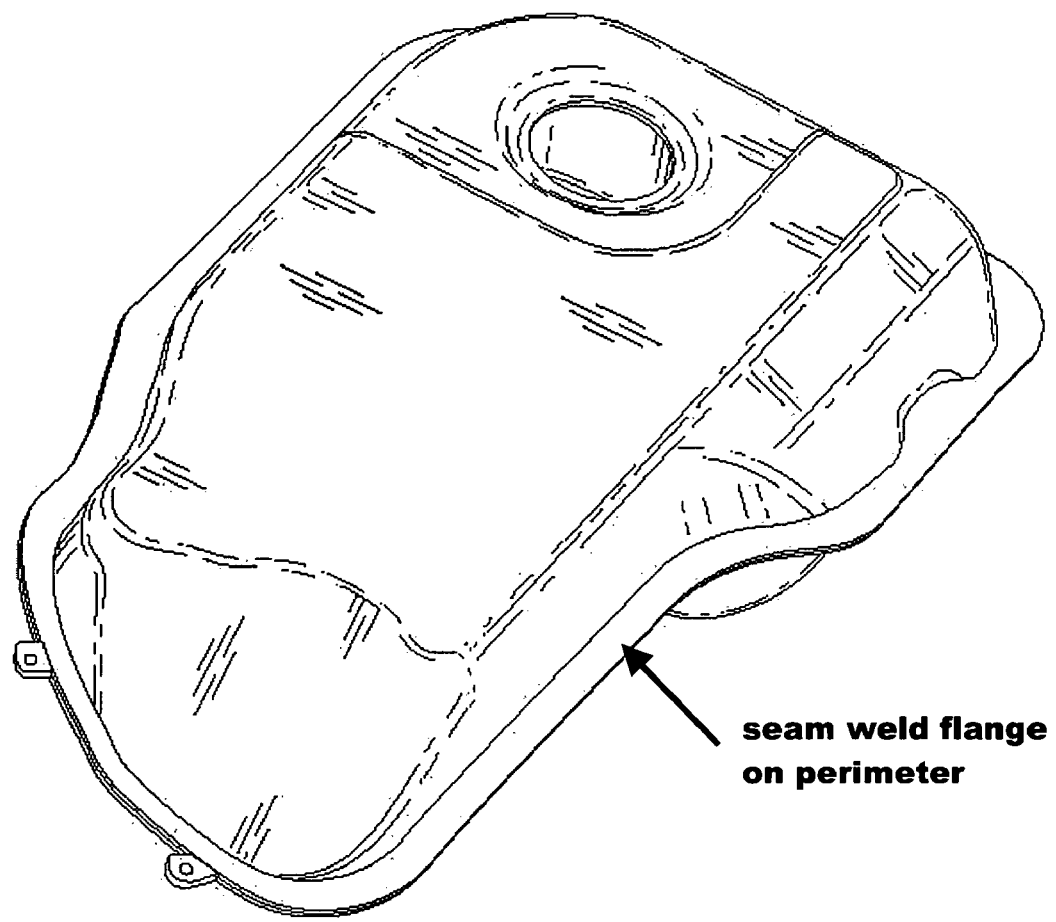
FIG. 6 is a perspective view of a typical clamshell tank assembly constructed from pre-hardened shells after flange seam welding.

The seam weld can be heated entirely, with shaped heating sources, or piece-wise (as the case for continuous seam welding on a mill) in the present invention. Heat is applied to the weld seam, using any of a variety of localized heat sources including, but not limited to, propane or oxyacetylene torches, resistance, electric arc, lasers, conductive, radiative, convective or high-frequency induction. The term "localized" is used herein to describe heat sources that provide heat to a localized area of a component, but do not heat the entire component, such as provided by a furnace or oven. In the case of continuous processes, such as in the production of seam welded pipe and tubing, selectively heating the localized weld seam area would be the most efficient embodiment for larger pipes. Alternatively, one would keep within the spirit of this invention by annularly heating the full circumference of the pipe, such as with a helical induction coil or other means. This annular heating is considered more appropriate for smaller pipe and tubing diameters. With reference to FIGS. 5 and 6, in a preferred embodiment, the entire weld seam is heated simultaneously which can be practiced for various constructions including circumferential welds, such as on hardenable alloy fuel or liquid tanks.

In addition to altering the hardness of the weld zone (i.e. reducing and/or tempering the amount of martensite present in the weld area microstructure), several other HAZ cracking contributors that the process mitigates include:

Allowing additional time for hydrogen diffusion and release while the steel is heated with the process. This retained hydrogen, when subject to applied or residual tensile stresses, is the cause of hydrogen induced cold-cracking in martensitic microstructures.

Relieves shrinkage strains and stresses in the weld due to reduced thermal gradients along the length of the weld.

Increasing fusion zone and HAZ ductility and toughness

Tempering any martensite in the weld and HAZ that has formed.

Figure 7:
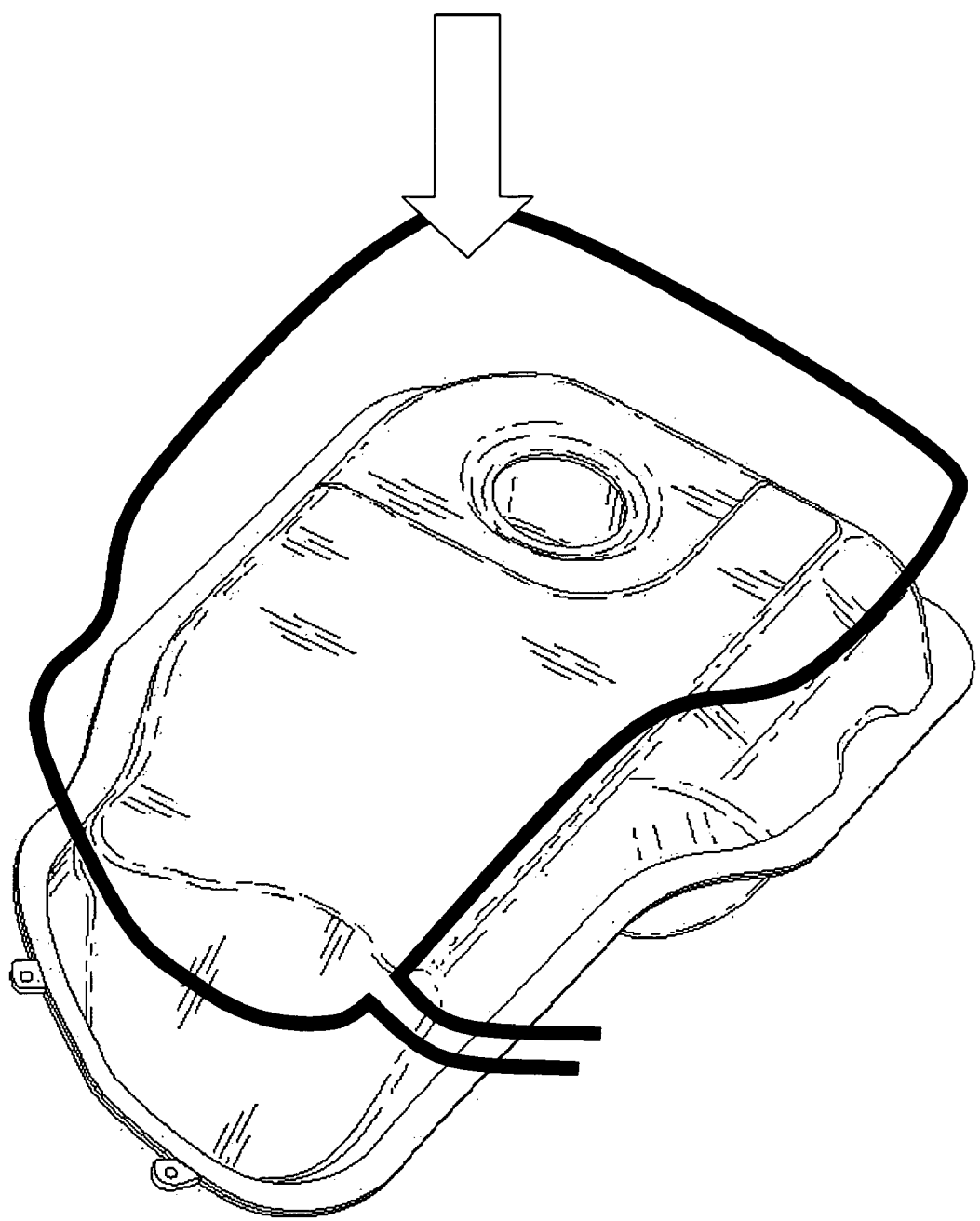
FIG. 7 is a perspective view of a typical clamshell tank assembly after flange seam welding showing localized weld seam heat treating with a formed resistance heating coil.
Figure 8:
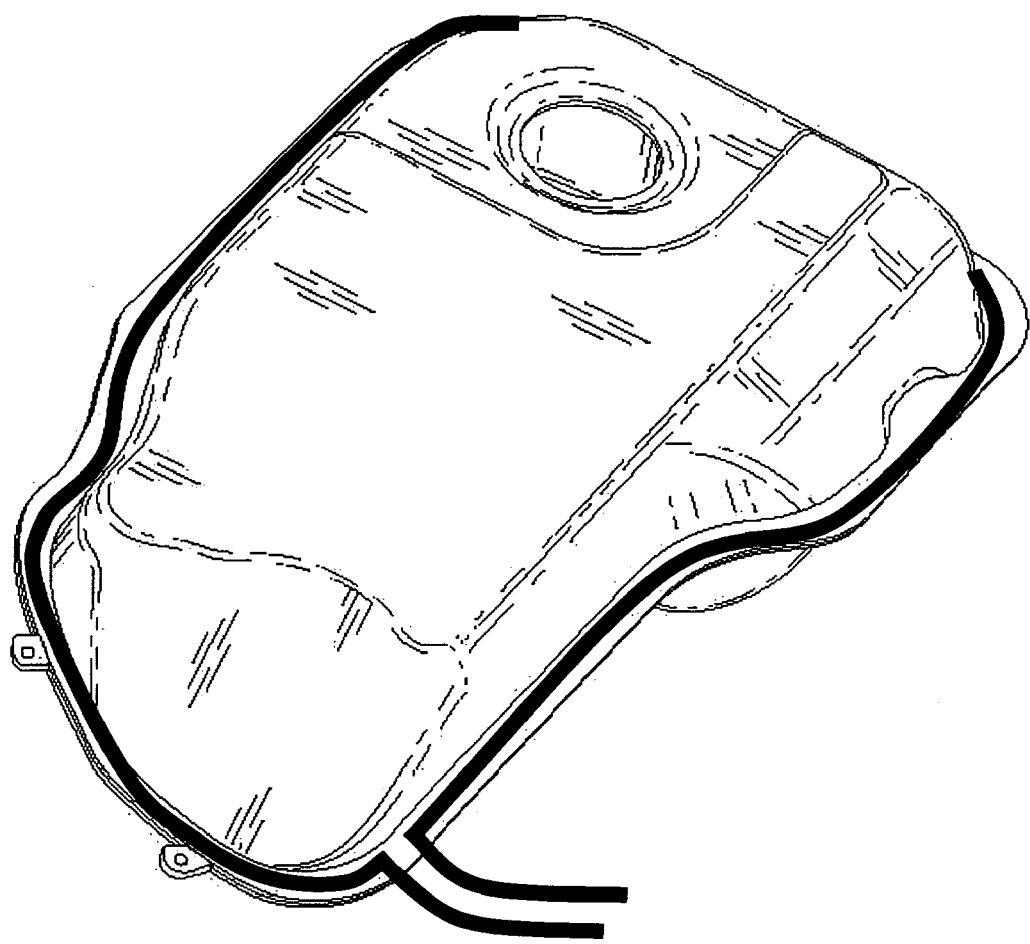
FIG. 8 is a perspective view of a typical clamshell tank assembly after flange seam welding showing localized weld seam heat treating with a formed resistance heating coil in use.

As illustrated in FIGS. 7 and 8, a formed resistance heating coil may be used to locally heat treat the seam weld around an entire tank's periphery. The heating coil can be applied from the top side, the bottom side, or both sides and is held in place, either by direct contact or positioned away from the seam weld surface, until the peak temperature is reached. The coil is then removed and the seam weld is allowed to air cool to room temperature. No protective atmosphere is needed; however, if necessary, the process can be carried out in a non-oxidizing atmosphere.

Figure 9:
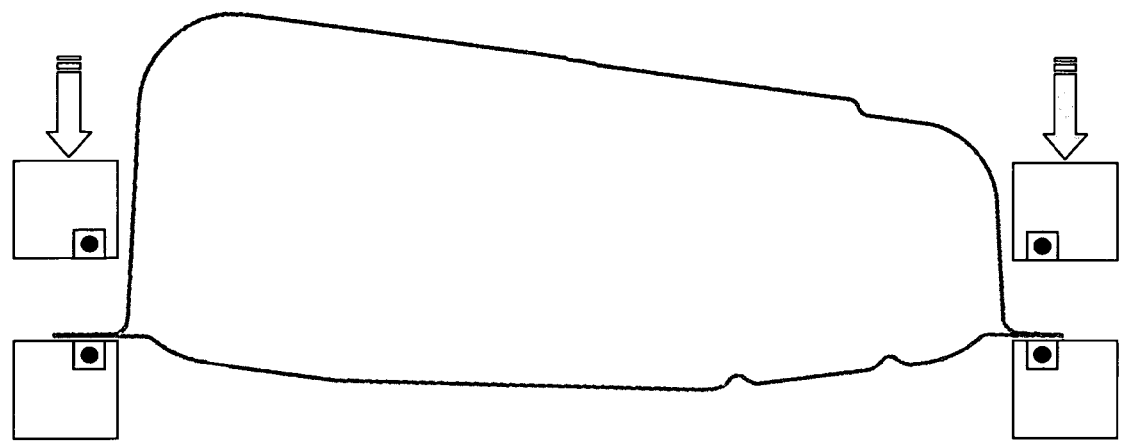
FIG. 9 is a cross-sectional side view of a typical clamshell tank assembly after flange seam welding showing localized weld seam heat treating with a heating coil (resistance or induction) located within clamping fixture.
Figure 10:
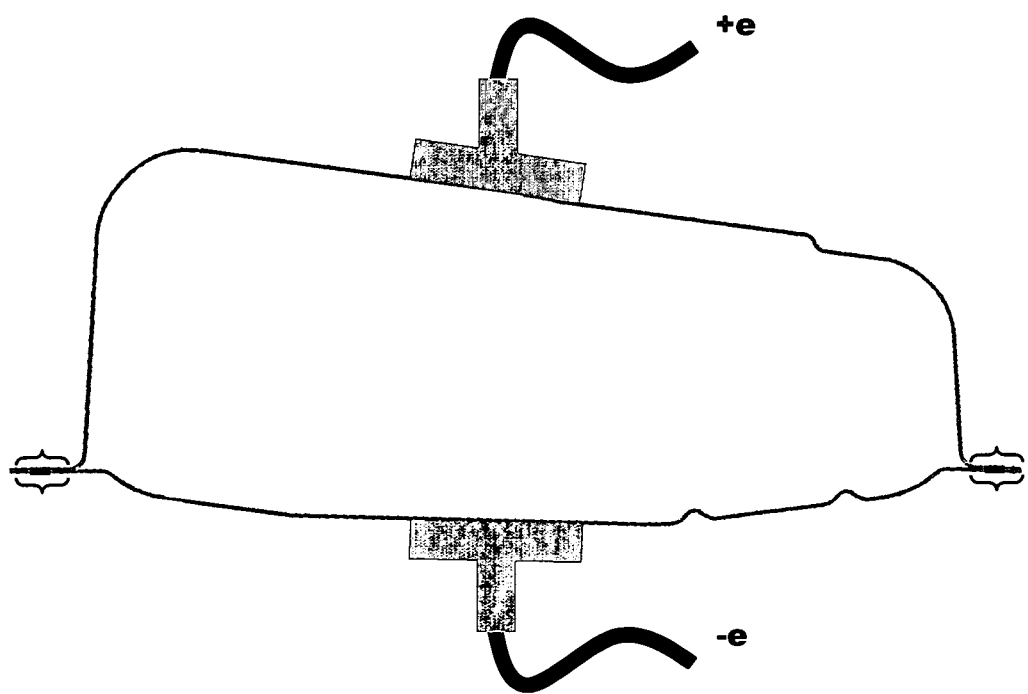
FIG. 10 is a cross-sectional side view of a typical clamshell tank assembly after flange seam welding showing localized weld seam heat treating by passing electrical current through shells for localized weld seam heat treatment.

With reference to FIGS. 9 and 10, alternatively, heat is applied to the weld seam using formed induction coils or flame or other methods. The heating coils may be encased in a press die-structure (FIG. 9), which restrains the seam weld from warpage during the process. In another embodiment of the heating process shown in FIG. 10, electrical current is passed from one component to the other, resistively heating the seam weld to the proper temperature.

Typical automotive structural applications that require seam welding of pre-hardened hardenable alloys include chassis components, A, B and C pillars, roof rails, roof bows, impact beams and bumpers. The size and scope of the final vehicle body assembly prohibits any full-structure post-weld stress relieving treatments. The post-weld heat treat process of the current invention is ideally suited to improve the as-welded joint performance of these and similar-type applications.

In practice, initial test results with air hardenable martensitic stainless steels have found significant improvement in the ductility and toughness of seam welds processed in accordance with the above described first and second embodiments when compared to as-welded specimens. For example, tests were run with the present invention on seam-welded test strips using type 410 stainless steel (UNS41000, SAE51410) of 0.5 mm, 1.0 mm, and 2.0 mm thicknesses. A linear-seam welding test fixture was designed to autogenously butt GTAW weld the test strips in 60 inch lengths, from which test coupons were taken from the central, steady-state portion of the weld. A one-sided linear induction coil was implemented downstream of the GTAW torch body in accordance with the present invention. Direct surface temperature measurements were obtained using a non-contact 3.9 µm wavelength infrared pyrometer.

Figure 11:
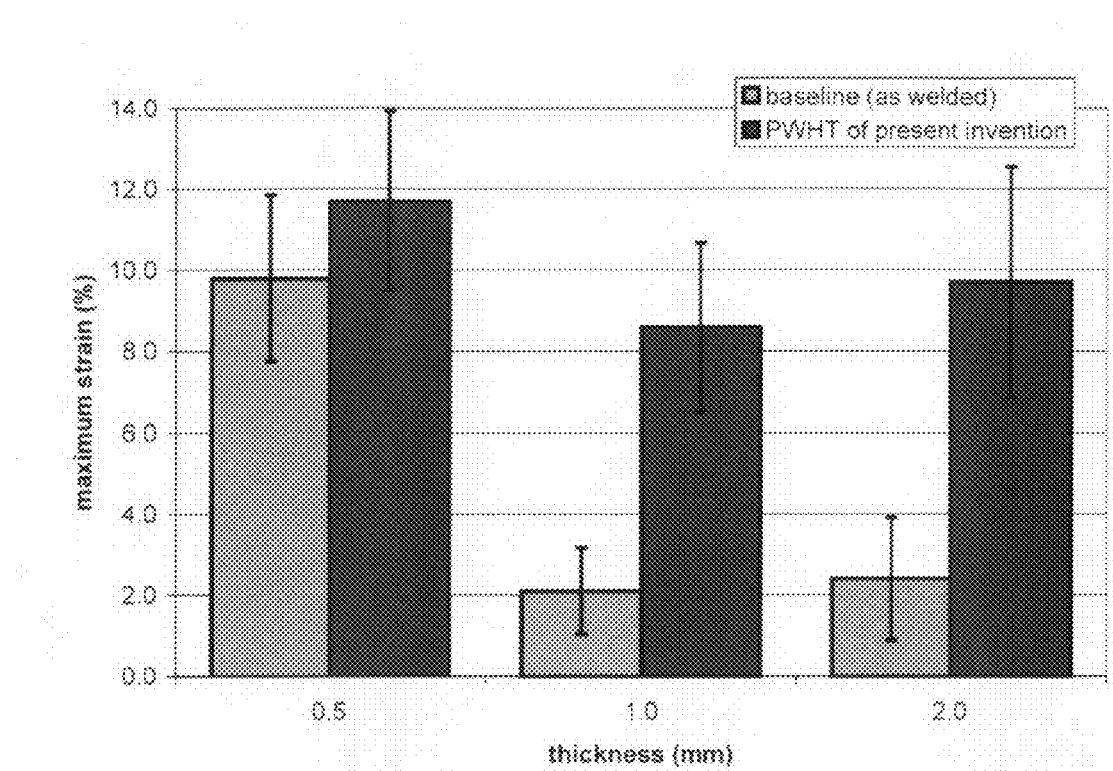
FIG. 11 is a bar graph comparing maximum strain at fracture for DIN EN 895 longitudinal tensile specimens of type 410 seam-welded samples processed according to the present invention with average results for 62 trials.

The seam weld was allowed to cool to approximately 180° C., below the martensite start temperature—Ms, as well as below the martensitic finish temperature—Mf, which are approximately 330° C. and 230° C., respectively, for type 410 stainless steel. Thereafter the completed seam weld was rapidly heated to approximately 650° C., just below the lower critical temperature—AC1, which is approximately 675° C., and immediately allowed to air cool. As illustrated in FIG. 11, which plots maximum elongation in the weld seam (longitudinal tensile) direction, the seam welded specimens exhibit significant improvement in the weld and HAZ ductility by tempering according to the process of the present invention. Most benefit is seen on the thicker test strips, as the thicker gauges impose a greater degree of seam weld joint restraint, and hence higher residual stresses, that the heat-treatment process of the present invention alleviates. Where different alloys are processed, the application of heat to the weld's $A_{C1}$—lower critical temperature (eutectoid temperature) or to a lower intermediate temperature may provide for different mechanical properties of weld zones and the selection of which will depend on the material used and mechanical properties desired.

The invention is ideally suited for all seam-welding processes, such as laser welding, resistance seam welding, and arc welding. The invention is also ideal for processing seam welds using hardenable weld filler alloys in addition to autogenous seam welds for reducing the brittleness of the fusion zone and HAZ. Selection of the upper temperature threshold, $A_{C1}$—lower critical temperature (eutectoid temperature) below which ferrite and carbide are stable, and $M_S$—martensitic start temperature, are dependent on the weld and base alloy's chemical composition. The natural cooling rate is dependent upon material thickness, joint geometry, alloy type and ambient conditions.

While several particular forms of the invention have been illustrated and described, it will be apparent that various modifications can be made without departing from the spirit and scope of the invention. Therefore, it is not intended that the invention be limited except by the following claims. Having described our invention in such terms so as to enable persons skilled in the art to understand the invention, recreate the invention and practice it, and having identified the presently preferred embodiments thereof, we claim:

We claim

1. A method of forming a steel structure comprising the steps of:

providing a first surface of a hardenable ferrous alloy having a carbon content equal or greater than 0.08% by weight;

providing a second surface of a hardenable ferrous alloy having a carbon content equal or greater than 0.08% by weight;

positioning said first surface adjacent to said second surface;

seam welding said first surface to said second surface by applying a first heat source to said first surface and said second surface at a sufficiently high temperature to said first surface and said second surface above their melting points to form a seam weld;

allowing said seam weld to cool to below the martensitic start temperature for said hardenable ferrous alloys;

tempering said seam weld subsequent to said step of allowing said seam weld to cool to below the martensitic start temperature for said hardenable ferrous alloys, said tempering including heating said seam weld at a rate of 10° C. per second or greater to above the martensitic start temperature but not to above the lower critical temperature for said hardenable ferrous alloys; and air cooling said seam weld at a rate of 15° C. per minute or greater after said step of tempering said seam weld.

2. The method of forming a steel structure of claim 1 wherein said step of tempering said seam weld is conducted at a rate of between 10° C. per second and 200° C. per second and said step of air cooling said seam weld is conducted at between 15° C. per minute and 200° C. per second.

3. The method of forming a steel structure of claim 1 wherein said step of tempering said seam weld includes utilizing a localized heat source to heat said seam weld.

4. The method of forming a steel structure of claim 3 wherein said step of tempering said seam weld is conducted at a rate of between 10° C per second and 200° C. per second and said step of air cooling said seam weld is conducted at between 15° C. per minute and 200° C. per second.

5. The method of forming a steel structure of claim 1 wherein each of said hardenable ferrous alloys are martensitic stainless steels of type 410, 420 or 440.

6. The method of forming a steel structure of claim 1 further comprising roller forming the steel structure into a desired shape, said step of roller forming occurring after the steps of welding said first and second surfaces together and tempering said weld.

7. The method of forming a steel structure of claim 6 wherein the steel structure is a tube and said first surface defines a first edge of a roll formed strip of a ferrous alloy and said second surface defines a second edge of the roll formed strip of ferrous alloy.

8. A method of forming a steel structure comprising the steps of:
- providing a first surface of a hardenable ferrous alloy having a carbon content equal or greater than 0.08% by weight;
- providing a second surface of a hardenable ferrous alloy having a carbon content equal or greater than 0.08% by weight;
- positioning said first surface adjacent to said second surface;
- seam welding said first surface to said second surface by applying a first heat source to said first surface and said second surface at a sufficiently high temperature to said first surface and said second surface above their melting points to form a seam weld;
- allowing said seam weld to cool to below the martensitic start temperature for said hardenable ferrous alloys;
- tempering said seam weld subsequent to said step of allowing said seam weld to cool to below the martensitic start temperature for said hardenable ferrous alloys, said tempering including heating said seam weld with a localized heat source at a rate of between 10° C. per second and 200° C. per second to above the martensitic start temperature but not to above the lower critical temperature for said hardenable ferrous alloys; and
- immediately air cooling said seam weld at a rate of between 15° C. per minute and 200° C. per second after said step of tempering said seam weld.

9. The method of forming a steel structure of claim 8 wherein each of said hardenable ferrous alloys are martensitic stainless steels of type 410, 420 or 440.

10. The method of forming a steel structure of claim 8 further comprising roller forming the steel structure into a desired shape, said step of roller forming occurring after the steps of welding said first and second surfaces together and tempering said weld.

11. The method of forming a steel structure of claim 10 wherein the steel structure is a tube and said first surface defines a first edge of a roll formed strip of a ferrous alloy and said second surface defines a second edge of the roll formed strip of ferrous alloy.

* * * * *